United States Patent Office 3,549,658
Patented Dec. 22, 1970

3,549,658
1-(1-SUBSTITUTED-3-PYRROLIDINYL)-3-ARYLSULFONYLUREAS
Grover Cleveland Helsley, Richmond, Va., assignor to A. H. Robins Company, Incorporated, Richmond, Va., a corporation of Virginia
No Drawing. Filed Aug. 12, 1968, Ser. No. 751,702
Int. Cl. C07d 27/04
U.S. Cl. 260—326.3        4 Claims

ABSTRACT OF THE DISCLOSURE 1-(1-substituted-3-pyrrolidinyl) - 3 - arylsulfonylures having hypoglycemic activity are disclosed. The novel compounds are prepared by reacting 1 - substituted-3-aminopyrrolidines with an arylsulfonyl carbamide.

---

The present invention relates to novel 3-pyrrolidinylsulfonylureas and is more particularly concerned with 1-(1-substituted-3-pyrrolidinyl)-3-arylsulfonylureas, compositions containing the same as active ingredients, and process for making and using them.

The compounds of the present invention have the general formula:

$$\underset{\underset{R}{|}}{\boxed{N}}\text{—NHCONHO}_2\text{S—}\underset{}{\bigcirc}\text{—R}^1 \qquad \text{Formula I}$$

wherein;

R is selected from the group consisting of lower-alkyl lower cycloalkyl and aryl, and
$R^1$ is selected from the group consisting of hydrogen, lower-alkyl and halogen.

The compounds of the invention having the foregoing Formula I are generally characterized by important pharmacological activity, exhibiting hypoglycemic activity in standard laboratory animals. When administered to rats at 200 mg./kg. per os, 1-(1-ethyl-3-pyrrolidinyl)-3-p-tollysulfonylurea and 1-(cyclohexyl-3-pyrrolidinyl)-3-p-tolylsulfonylurea produced a marked depression in blood sugar levels as determined by the method of Somogyi-Nelson (J. Biol. Chem. 160, 62, 1945). The novel compounds of the present invention in addition to their hypoglycemic activity are relatively non-toxic, the $LD_{50}$'s of the compounds averaging 1750–1800 mg./kg., i.p. as determined in mice.

The primary object of this invention is to provide new and useful 1-(1-substituted-3-pyrrolidinyl)-3-arylsufonylureas composiitons containing the same as active ingredients and methods of making and using them.

Other objects of the invention will be apparent to one skilled in the art, and still other objects will become apparent from the following description and the appended claims.

In the foregoing Formula I and where they appear elsewhere throughout this specification, the terms have the following significance.

The term "lower alkyl" as used herein includes straight and branched chain radicals of up to eight carbon atoms inclusive and is exemplified by such groups as methyl, ethyl, propyl, isopropyl, butyl, tertiary butyl, amyl, hexyl, isoamyl, heptyl, octyl and the like.

By "aryl" is meant a radical of the benzene series having six ring carbon atoms and this term includes the unsubstituted phenyl radical as well as substituted phenyl radicals. A substituted phenyl radical is a phenyl radical substituted by one or more substituents which are not reactive or otherwise interfering under the conditions of reaction in the processes for making the compounds. Such substituents include lower-alkyl, lower alkoxy, trifluoromethyl, nitro, halo and the like. The substituted phenyl radicals have preferably no more than one to three substituents such as those given above and, furthermore, these substituents can be in various available positions of the phenyl nucleus and when more than one substituent is present, can be the same or different and can be in various position combinations relative to each other. The lower alkyl and lower alkoxy substituents each have preferably from one to four carbon atoms which can be arranged as straight or branched chains. A total of nine carbon atoms in all ring substituents, making a total of fifteen carbon atoms in the radical, is the preferred maximum. The term "lower cycloalkyl" as used herein includes primarily cyclic alkyl radicals containing three up to nine atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl.

When halogen is referred to herein, preferably but not necessarily a halogen of atomic weight in excess of nineteen but not greater than eighty is employed. Chlorine is the preferred halogen.

Generally, the 1 - (1-substituted-3-pyrrolidinyl)-3-arylsulfonylureas are prepared by mixing and reacting together equimolar amounts of a 3-aminopyrrolidine (II) and an arylsulfonyl carbamide (III). The reaction sequence is illustrated by the following equation:

$$\underset{\underset{R}{|}}{\boxed{N}}\text{—NH}_2 + \text{H}_2\text{CONHO}_2\text{S—}\bigcirc\text{—R}^1 \longrightarrow$$

$$\text{II} \qquad \qquad \text{III}$$

$$\underset{\underset{R}{|}}{\boxed{N}}\text{—NHCONHO}_2\text{S—}\bigcirc\text{—R}^1$$

$$\text{I}$$

The reactants are combined in an aprotic solvent, preferably dioxane, and heated usually at the reflux temperature of the solvent used for a period of from about two hours to about six hours. When the reaction is run at temperatures below reflux, an increased reaction time is necessary to complete the reaction. The course of the reaction is accompanied by the evolution of ammonia followed by precipitation of a white crystalline product. The product is isolated by filtration of the cooled reaction mixture and is washed with a dioxane-ether mixture. The crystalline product may be further purified by recrystallization from a suitable solvent mixture, as, for example, methanol-isopropanol or methanol-water.

The general procedure for preparing the novel compounds is more specifically shown in the following examples which are given by way of illustration only and are not to be construed as limiting.

EXAMPLE 1

1-(1-methyl-3-pyrrolidinyl)-3-p-tolyl)sulfonylurea

A mixture of 3.0 g. (0.03 mole) of 3-amino-1-methylpyrrolidine, 6.45 g. (0.03 mole) of p-tolylsulfonyl carbamide and 150 ml. of dioxane was stirred at the reflux temperature for three hours. Ammonia was evolved during the first hour of heating and a white precipitate separated from the solution. The cooled mixture was filtered and the crystalline product was washed with a dioxane-ether mixture. The dried product melted at 191–193° C. and weighed 7.0 g. (78% yield). Following recrystallization from a methanol-water mixture, the product melted at 192–193° C.

*Analysis.*—Calculated for $C_{13}H_{19}N_3O_3S$ (percent): C, 52.51; H, 6.44; N, 14.13. Found (percent): C, 52.40; H, 6.54; N, 14.46.

EXAMPLE 2

1-(1-ethyl-3-pyrrolidinyl)-3-(p-tolyl)sulfonylurea

A mixture of 5.2 g. (0.046 mole) of 3-amino-1-ethyl pyrrolidine, 9.6 g. (0.046 mole) of p-tolylsulfonyl carbamide and 150 ml. of dry dioxane was stirred at the reflux temperature for five hours. Ammonia was evolved during the first hour of heating and a white precipitate separated from the solution. The cooled mixture was filtered and the crystalline product was washed with a dioxane-ether mixture. The dried compound weighed 13.8 g. (96% yield) and melted at 179–180° C.

*Analysis.*—Calculated for $C_{14}H_{21}N_3O_3S$ (percent): C, 54.00; H, 6.80; N, 13.49. Found (percent): C, 53.95; H, 6.79; N, 13.39.

EXAMPLE 3

1(1-cyclohexyl-3-pyrrolidinyl)-3-(p-tolyl)sulfonylurea

A mixture of 5.04 g. (0.03 mole) of 3-amino-1-cyclohexylpyrrolidine, 6.45 g. (0.03 mole) of p-tolylsulfonyl carbamide and 150 ml. of dioxane was stirred at the reflux temperature for five hours; ammonia was evolved during the first hour of heating and a white precipitate separated from the solution. The cooled mixture was filtered and the crystalline product was washed with a dioxane-ether mixture. The dried product weighed 8.9 g. (81% yield) and melted at 182–183° C. The compound melted at 179–180° C. following recrystallization from a methanol-isopropyl ether mixture.

*Analysis.*—Calculated for $C_{18}H_{27}N_3O_3S$ (percent): C, 59.15; H, 7.45; N, 11.50. Found (percent): C, 59.13; H, 7.41; N, 11.49.

Utilizing the procedure of the Examples 1–3 given hereinabove, the following compounds are prepared from the stated ingredients:

1 - (1 - benzyl - 3-pyrrolidinyl)-3-(p-chlorophenyl) sulfonylurea is prepared from 3 - amino - 1 - benzylpyrrolidine adn p-chlorophenylsulfonyl carbamide.

1 - (1 - phenyl - 3-pyrrolidinyl)-3-(p-chlorophenyl) sulfonylurea is prepared from 3-amino - 1 - phenylpyrrolidine and p-chlorophenylsulfonyl carbamide, 1 - (1 - isopropyl - 3-pyrrolidinyl)-3-(p-tolyl)sulfonylurea is prepared from 3 - amino - 1 - isopropylpyrrolidine and p-tolylsulfonyl carbamide, 1 - [1 - (p - chlorophenyl)-3-pyrrolidinyl]-3-p-tolyl) sulfonylurea is prepared from 3-amino - 1 - (p - chlorophenyl)pyrrolidine and p-tolylsulfonyl carbamide, 1 - (1 - butyl - 3-pyrrolidinyl)-3-phenylsulfonylurea is prepared from 3 - amino - 1 - butylpyrrolidine and phenylsulfonyl carbamide, 1 - (1 - cyclopentyl - 3-pyrrolidinyl)-3-(p-tolyl)sulfonylurea is prepared from 3 - amino - 1 - cyclopentylpyrrolidine and p-tolyl-sulfonyl carbamide.

As stated hereinabove, the new 1-(1-substituted-3-pyrrolidinyl) - 3 - arylsulfonylureas have demonstrated hypoglycemic activity and are therefore useful in controlling blood sugar levels in warm-blooded animals. Compositions containing an effective amount of the pharmacologically active novel compounds are usually administered orally, for instance, in the form of tablets, pills, dragees or powders, preferably filled in gelatin capsules and the like, or also in liquid form, for instance, as aqueous solutions, syrups, elixirs or the like, or in case of insoluble compounds, as emulsions, suspensions and the like.

When preparing tablets and other compressed forms, or powders to be placed in capsules of absorbable material, such as the usual gelatin capsules, or in powder packets, commonly used diluting agents such as corn starch, dextrose, lactose, sugar and the like are admixed to the active compounds. Binders such as pectins, gelatin, gum arabic, methyl cellulose, yeast extract, agar, tragacanth, and lubricants such as magnesium stearate, calcium stearate, stearic acid, talc and the like are also used.

The following illustrative compositions are within the scope of the present invention:

FORMULATIONS (1) Capsules

Capsules of 100 mg., 250 mg., and 500 mg. of active ingredient per capsule are prepared. With the higher amounts of active ingredient, reduction may be made in the amount of lactose.

(A) 100 mg. capsule:                    Per capsule, mg.
   Active ingredient _____ 100.0
   Lactose _____ 214.0
   Starch _____  87.0
   Magnesium stearate _____   5.0
                                          -----
   Total _____ 406.0

(B) 250 mg. capsule:
   Active ingredient _____ 250.0
   Lactose _____ 163.0
   Starch _____  81.0
   Magnesium stearate _____   6.0
                                          -----
   Total _____ 500.0

(C) 500 mg. capsule:
   Active ingredient _____ 500.0
   Lactose _____  95.0
   Starch _____  47.0
   Magnesium stearate _____   8.0
                                          -----
   Total _____ 650.0

In each case, uniformly blend the selected active ingredient with lactose, starch, and magnesium stearate and encapsulate the blend.

(2) Tablets

A typical formulation for a tablet containing 100 mg. of active ingredient per tablet follows. The formulation may be used for other strengths of active ingredient by adjustment of weight of dicalcium phosphate.

(A) 100 mg. tablet:                     Per tablet, mg.
   Active ingredient _____ 100.0
   Lactose _____  90.0
   Dicalcium phosphate _____  90.0
   Starch _____  33.0
   Milo starch _____  17.0
   Calcium stearate _____   2.0
                                          -----
   Total _____ 332.0

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit over night. The dried granules are passed through a number ten mesh screen. These dried granules are blended with the proper weight of calcium stearate and the lubricated granules are then converted into tablets on a suitable tablet press.

(B) 250 mg. tablet:                     Per tablet, mg.
   Active ingredient _____ 250.0
   Corn starch _____  20.0
   Carbowax 6000 (polyethylene glycol of M.W.
     approximately 6000) _____  10.0
   Lactose _____  20.0
   Magnesium stearate _____   2.0
                                          -----
   Total _____ 302.0

Uniformly blend the active ingredient, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

(C) 500 mg. tablet:                    Per tablet, mg.
    Active ingredient _____ 500.0
    Corn starch (wet) _____  50.0
    Milo starch _____  20.0
    Calcium stearate _____   6.0
    Corn starch (dry) _____  20.0
                                        _____
    Total _____ 596.0

Uniformly blend the active ingredient, corn starch and milo starch. This blend is wet granulated using water and the wet mass is passed through a number eight mesh screen. These wet granules are dried over night at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

Various modifications and equivalents will be apparent to one skilled in the art and may be made in the compounds, methods, compositions, and procedures of the present invention without departing from the spirit or scope thereof, and it is therefore to be understood that the invention is to be limited only by the scope of the appended claims.

What is claimed is:
1. A compound selected from the group of compounds having the formula:

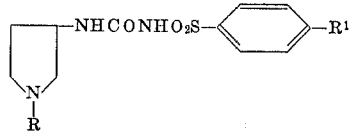

wherein

R is selected from the group consisting of lower-alkyl, cyclopentyl, cyclohexyl, phenyl and p-chlorophenyl, and $R^1$ is selected from the group consisting of hydrogen, lower-alkyl and halogen.

2. A compound of claim 1, which is 1(1-methyl-3-pyrrolidinyl)-3-(p-tolyl)sulfonylurea.

3. A compound of claim 1, which is 1-(1-ethyl-3-pyrrolidinyl)-3-(p-tolyl)sulfonylurea.

4. A compound of claim 1, which is 1-(1-cyclohexyl-3-pyrrolidinyl)-3-(p-tolyl)sulfonylurea.

References Cited

UNITED STATES PATENTS 3,432,491   3/1969   Jucker et al. _____ 260—239.6
3,475,450  10/1969   Kabbe et al. _____ 260—326.1

ALEX MAZEL, Primary Examiner

J. A. NARCAVAGE, Assistant Examiner

U.S. Cl. X.R.
424—274